US007738558B2

(12) United States Patent
Ma

(10) Patent No.: US 7,738,558 B2
(45) Date of Patent: Jun. 15, 2010

(54) VECTOR CODING METHOD AND APPARATUS AND COMPUTER PROGRAM

(75) Inventor: Fuwei Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/343,390

(22) Filed: Dec. 23, 2008

(65) Prior Publication Data

US 2009/0097587 A1 Apr. 16, 2009

Related U.S. Application Data

(63) Continuation of application No. PCT/CN2008/071481, filed on Jun. 30, 2008.

(30) Foreign Application Priority Data

Jul. 23, 2007 (CN) ........................ 2007 1 0129604

(51) Int. Cl.
*H04N 7/18* (2006.01)

(52) U.S. Cl. ............................ 375/240.22; 375/240.26

(58) Field of Classification Search ............................... 375/240.01–240.29
See application file for complete search history.

(56) References Cited

U.S. PATENT DOCUMENTS 4,896,361 A 1/1990 Gerson
5,105,271 A 4/1992 Niihara et al.
5,295,203 A 3/1994 Krause et al.
5,748,839 A 5/1998 Serizawa et al.
5,751,856 A 5/1998 Hirabayashi et al.
6,014,186 A 1/2000 Kim et al.
6,097,771 A 8/2000 Foschini
6,215,823 B1 4/2001 Kim et al.

(Continued)

FOREIGN PATENT DOCUMENTS

WO WO-9528699 10/1995

(Continued)

OTHER PUBLICATIONS

Xie, M., and Adoul, J., 1996. “Embedded Algebraic Vector Quantizers (EAVQ) with Application to Wideband Speech Coding”. Proceedings of the Acoustics, Speech, and Signal Processing, 1996 IEEE International Conference, vol. 1, pp. 240-243.

(Continued)

*Primary Examiner*—Andy S Rao

(57) ABSTRACT

A vector coding apparatus and method includes decomposing an initial vector to obtain a sign vector and an initial absolute vector. Coding the sign vector to obtain a sign code, performing multi-level permutation-based coding on the initial absolute vector to obtain an absolute vector code, and combining the sign code and the absolute vector code. Optionally determining, before decomposing the initial vector, a characteristic codebook to which the initial vector belongs, obtaining a characteristic value of the characteristic codebook, and combining a code of the initial vector to obtain a final code of the initial vector. The performing step can include removing from the initial absolute vector any element having a value which satisfies a preset condition, constructing a new absolute vector with elements not satisfying the preset condition, and coding positions of the elements not satisfying the preset condition in the initial absolute vector to obtain a position code.

17 Claims, 6 Drawing Sheets

U.S. PATENT DOCUMENTS

| | | | | |
|---|---|---|---|---|
| 6,249,759 | B1 | 6/2001 | Oda et al. | |
| 8,349,284 | | 2/2002 | Park et al. | |
| 6,606,600 | B1 | 8/2003 | Murgia et al. | |
| 6,680,974 | B1 * | 1/2004 | Faryar et al. | 375/240.18 |
| 6,717,990 | B1 | 4/2004 | Abousleman | |
| 6,724,821 | B1 | 4/2004 | Sawada et al. | |
| 6,728,413 | B2 | 4/2004 | Onno et al. | |
| 6,760,385 | B1 | 7/2004 | Goodson | |
| 6,931,158 | B2 * | 8/2005 | Malvar | 382/240 |
| 6,999,472 | B2 | 2/2006 | Hamalainen et al. | |
| 7,106,228 | B2 | 9/2006 | Bessette et al. | |
| 7,154,936 | B2 | 12/2006 | Bjerke et al. | |
| 7,221,761 | B1 * | 5/2007 | Deshpande et al. | 380/216 |
| 7,362,807 | B2 | 4/2008 | Kondo et al. | |
| 7,394,853 | B2 | 7/2008 | Kondo et al. | |
| 2002/0012386 | A1 | 1/2002 | Shanbhag | |
| 2003/0043908 | A1 | 3/2003 | Gao | |
| 2005/0228653 | A1 | 10/2005 | Morii | |
| 2006/0280254 | A1 | 12/2006 | Luby et al. | |
| 2007/0033019 | A1 | 2/2007 | Yasunaga et al. | |
| 2007/0064791 | A1 | 3/2007 | Okada et al. | |
| 2007/0109320 | A1 * | 5/2007 | Skibak et al. | 345/611 |
| 2007/0162236 | A1 | 7/2007 | Lamblin et al. | |
| 2007/0183505 | A1 | 8/2007 | Shimizu et al. | |
| 2007/0201557 | A1 | 8/2007 | Francois et al. | |
| 2007/0211786 | A1 | 9/2007 | Shattil | |
| 2007/0253479 | A1 | 11/2007 | Mukherjee | |
| 2007/0255558 | A1 | 11/2007 | Yasunaga et al. | |
| 2007/0271094 | A1 | 11/2007 | Ashley et al. | |
| 2007/0271101 | A1 | 11/2007 | Sato et al. | |

FOREIGN PATENT DOCUMENTS

| | | |
|---|---|---|
| WO | WO-2004077733 | 9/2004 |
| WO | WO-2005078706 | 8/2005 |
| WO | WO-2006135878 | 12/2006 |

OTHER PUBLICATIONS

"Digital cellular telecommunications system (Phase 2+); Universal Mobile Telecommunications System (UMTS); Speech codec speech processing functions; Adaptive Multi-Rate—Wideband (AMR-WB) speech codec; Transcoding functions (3GPP TS 26.190 version 7.0.0 Release 7)". European Telecommunications Standards Institute Telecommunication Standard 126 190 v7.0.0, Jun. 2007.

"Digital cellular telecommunications system (Phase 2+); Universal Mobile Telecommunications System (UMTS); Audio codec processing functions; Extended Adaptive Multi-Rate—Wideband (AMR-WB+) codec; Transcoding functions (3GPP TS 26.290 version 7.0.0 Release 7)". European Telecommunications Standards Institute Telecommunication Standard 126 290 v7.0.0, Mar. 2007.

Schwendowius, J., and Arce, G.R. 1997. "Data-adaptive digital video format conversion algorithms". Circuits and Systems for Video Technology, IEEE Transactions on, vol. 7, Issue 3, Jun. 1997 pp. 511-526.

Biglieri, et al, 1999. "Representing group codes as permutation codes". IEEE Transactions on Information Theory 45(6): 2204-2207. Abstract.

Zeger, et al, 1990. "Source/channel coding for vector quantizers by index assignment permutations". IEEE International Symposium on Information Theory, Jan. 14-19, San Diego, California, pp. 78-79. Summary.

Lamblin, C., et al., "Algorithme de quantification vectorielle spherique a partir du reseau de gosset d'ordre 8," Annales des Telecommincations, Mar. 1, 1988, p. 172-186, vol. 43, No. 3/04, Les Moulineaux, France.

Chen, C., et al., "A novel scheme for optimising partitioned VQ using a modified resolution measure," Signal Processing, Jan. 1, 1997, p. 157-163, vol. 56, No. 2, Elsevier Science Publishers B.V., Amsterdam, Netherlands.

"Digital cellular telecommunications system (Phase 2+); Universal Mobile Telecommunications System (UMTS); Audio codec processing functions; Extended Adaptive Multi-Rate—Wideband (AMR-WB+) codec; Transcoding functions (3GPP TS 26.290 version 7.0.0 Release 7)". European Telecommunications Standards Institute Telecommunication Standard 126 290 v7.0.0, Mar. 2007.

Office Action of U.S. Appl. No. 12/343,450, mail date: Apr. 13, 2009; 20 pages.

Draft new Recommendation G.729EV "An 8-32 kbit/s scalable wideband speech and audio coder bitstream interoperable with G.729" (For Consent), Contact: Stephane Ragot, et al.; Meeting date: April 3, 2006; 98 pages.

Vasilache, et al., "Indexing and Entropy Coding of Lattice Codevectors," IEEE, 2001, pp. 2605-2608.

Wang, et al., "Lattice Labeling Algorithms for Vector Quantization," IEEE Transactions on Circuits and Systems for Video Technology, 1998, vol. 8, No. 2, pp. 206-220.

Rault, et al., "Indexing Algorithms for Zn2, An, Dn and Dn++ Lattice Vector Quantizers," IEEETransactions on Multimedia, Dec. 2001, vol. 3, No. 4, pp. 395-404.

Chinese Application No. 200710129606 Office Action dated Mar. 13, 2009, 12 pages.

Zeger, et al, "Source/Channel Coding for Vector Quantizers by Index Assignment Permutations". *IEEE International Symposium on Information Theory*, 1990, pp. 78-79.

Wadayama, et al., "A Multilevel Construction of Permutation Codes". *IEICE Trans Fund Electron Commun Comput Sci*, 2001, 84(10), pp. 2518-2522.

Biglieri, "Permutation decoding of group codes," International Symposium on Information Theory & its Applications, 1994, 20-24, pp. 1055-1058.

U.S. Appl. No. 12/343,424 Office Action, dated Jun. 29, 2009, 22 pages.

Wadayama, T., and Vinck, A. J. H., 2001. "A multilevel construction of permutation codes". IEICE Trans Fund Electron Commun Comput Sci 84(10): 2518-2522. Abstract.

Biglieri, Ezio, 1994. "Permutation decoding of group codes". Natl Conf Publ Inst Eng Aust 2(94/9): 1055-1058. Abstract.

U.S. Appl. No. 12/343,450 Office Action mailed Aug. 20, 2009 (22 pages).

Chinese Office Action of Application No. 2007101296046 (11 pages), Jun. 25, 2009.

Translation of the Jun. 25, 2009 Chinese Office Action of Application 2007101296046, Citations 1 and 2 (2 pages).

* cited by examiner

VECTOR CODING METHOD AND APPARATUS AND COMPUTER PROGRAM

CLAIM OF PRIORITY

This application claims the benefit of priority, under 35 U.S.C. §111, as a continuation of International Patent Application No. PCT/CN2008/071481, filed on Jun. 30, 2008 and titled "Vector Coding/Decoding Method and Apparatus and Stream Media Player," and the benefit of priority of Chinese Patent Application No. 200710129604.6, filed on Jul. 23, 2007, and titled "Vector Coding/Decoding Method and Apparatus and Stream Media Player," which are both hereby incorporated by reference in their entirety.

FIELD OF THE INVENTION

The present invention relates to codec technologies and in particular to a vector coding method and apparatus and a computer program.

BACKGROUND OF THE INVENTION

Vector quantization technologies are usually deployed in stream media coding, a common one of the technologies is lattice vector quantization which is quite widely used in low-rate scenarios. In audio coding, for example, the quantization technology deployed in Transform Code Excite (TCX) part of the widely used Extend Adaptive Multi-Rate Wideband codec (AMR-WB+) audio coding algorithm is a multi-rate lattice vector quantization technique built on $RE_8$—an eight-dimensional lattice known to ordinary skilled artisans as the Gosset lattice.

In the TCX part of the AMR-WB+ audio coding algorithm, the multi-rate lattice vector quantization approach is applied as the quantization approach. The multi-rate lattice vector quantization approach is applied on preshaped spectral data by groups each having eight values, and quantizes the eight values as elements in the $RE_8$ set based on a principle of proximity. In the algorithm, a set of elements is selected from the $RE_8$ with the quantization, which is defined as $RE_8=2D_8\cup\{2D_8+(1, \ldots, 1)\}$, where $D_8=\{(x_1, x_2, \ldots, x_8)\in Z^8 | x_1+ \ldots +x_8 \text{ is even}\}$. Therefore, the sum of all elements in the $RE_8$ set is a multiple of 4. Thus, the quantization approach includes searching the $2D_8$ set for an element closest to the original data, searching the $2D_8+(1, 1, 1, \ldots, 1)$ set for an element closest to the original data, and comparing the two elements searched out to obtain a result, i.e. an initial vector, which is a group of integer data $(x_0, x_1, \ldots, x_{n-1})$ denoted by $c_k$. Because the inputted data is divided into groups each having eight values, the resulting $c_k$ is actually $(x_0, x_1, \ldots, x_7)$.

Subsequently, basic codebooks of $Q_0$, $Q_2$, $Q_3$, $Q_4$ are searched for the $c_k$. If no $c_k$ is found in the basic codebooks, the basic codebooks are extended with the $c_k$ through Voronoi extension, so that a corresponding basic codebook index and an extended codebook index are determined. The basic codebooks of $Q_0$, $Q_2$, $Q_3$, $Q_4$ are shown in Table 1 below.

TABLE 1

Basic codebooks

| Sphere | Ka | Leader | Combination | Sign | Size | $Q_0$ | $Q_2$ | $Q_3$ | $Q_4$ |
|---|---|---|---|---|---|---|---|---|---|
| 0 | | {0, 0, 0, 0, 0, 0, 0, 0} | | | 1 | X | | | |
| 2 | 0 | {1, 1, 1, 1, 1, 1, 1, 1} | 1 | 128 | 128 | | X | X | |
| 8 | 1 | {2, 2, 0, 0, 0, 0, 0, 0} | 28 | 4 | 112 | | X | X | |
| 16 | 2 | {2, 2, 2, 2, 0, 0, 0, 0} | 70 | 16 | 1120 | | | X | |
| 22 | 3 | {3, 1, 1, 1, 1, 1, 1, 1} | 8 | 128 | 1024 | | | X | |
| 64 | 4 | {4, 0, 0, 0, 0, 0, 0, 0} | 8 | 2 | 16 | | X | X | |
| 24 | 5 | {2, 2, 2, 2, 2, 2, 0, 0} | 28 | 64 | 1792 | | | | X |
| 42 | 6 | {3, 3, 1, 1, 1, 1, 1, 1} | 28 | 128 | 3584 | | | | X |
| 72 | 7 | {4, 2, 2, 0, 0, 0, 0, 0} | 168 | 8 | 1344 | | | X | |
| 32 | 8 | {2, 2, 2, 2, 2, 2, 2, 2} | 1 | 256 | 256 | | | | X |
| 62 | 9 | {3, 3, 3, 1, 1, 1, 1, 1} | 56 | 128 | 7168 | | | | X |
| 80 | 10 | {4, 2, 2, 2, 2, 0, 0, 0} | 280 | 32 | 8960 | | | | X |
| 128 | 11 | {4, 4, 0, 0, 0, 0, 0, 0} | 28 | 4 | 112 | | | X | |
| 158 | 12 | {5, 1, 1, 1, 1, 1, 1, 1} | 8 | 128 | 1024 | | | | X |
| 82 | 13 | {3, 3, 3, 3, 1, 1, 1, 1} | 70 | 128 | 8960 | | | | X |
| 88 | 14 | {4, 2, 2, 2, 2, 2, 2, 0} | 56 | 128 | 7168 | | | | X |
| 136 | 15 | {4, 4, 2, 2, 0, 0, 0, 0} | 420 | 16 | 6720 | | | | X |
| 178 | 16 | {5, 3, 1, 1, 1, 1, 1, 1} | 56 | 128 | 7168 | | | | X |
| 328 | 17 | {6, 2, 0, 0, 0, 0, 0, 0} | 56 | 4 | 224 | | | X | |
| 192 | 18 | {4, 4, 4, 0, 0, 0, 0, 0} | 56 | 8 | 448 | | | | X |
| 336 | 29 | {6, 2, 2, 2, 0, 0, 0, 0} | 280 | 16 | 4480 | | | | X |
| 392 | 20 | {6, 4, 2, 0, 0, 0, 0, 0} | 336 | 8 | 2688 | | | | X |
| 1202 | 21 | {7, 7, 1, 1, 1, 1, 1, 1} | 8 | 128 | 1024 | | | | X |
| 1024 | 22 | {8, 0, 0, 0, 0, 0, 0, 0} | 8 | 2 | 16 | | | | X |
| 648 | 23 | {6, 6, 0, 0, 0, 0, 0, 0} | 28 | 4 | 112 | | | | X |
| 1032 | 24 | {8, 2, 2, 0, 0, 0, 0, 0} | 168 | 8 | 1344 | | | | X |
| 1088 | 25 | {8, 4, 0, 0, 0, 0, 0, 0} | 56 | 4 | 224 | | | | X |
| 1642 | 26 | {9, 1, 1, 1, 1, 1, 1, 1} | 8 | 128 | 1024 | | | | X |
| 2504 | 27 | {10, 2, 0, 0, 0, 0, 0, 0} | 56 | 4 | 224 | | | | X |
| 2048 | 28 | {8, 8, 0, 0, 0, 0, 0, 0} | 28 | 4 | 112 | | | | X |
| 2824 | 39 | {10, 6, 0, 0, 0, 0, 0, 0} | 56 | 4 | 224 | | | | X |
| 5184 | 30 | {12, 0, 0, 0, 0, 0, 0, 0} | 8 | 2 | 16 | | | | X |
| 5248 | 31 | {12, 4, 0, 0, 0, 0, 0, 0} | 56 | 4 | 224 | | | | X |
| 5000 | 32 | {10, 10, 0, 0, 0, 0, 0, 0} | 28 | 4 | 112 | | | | X |
| 9608 | 33 | {14, 2, 0, 0, 0, 0, 0, 0} | 56 | 4 | 224 | | | | X |
| 6208 | 34 | {12, 8, 0, 0, 0, 0, 0, 0} | 56 | 4 | 224 | | | | X |
| 16384 | 35 | {16, 0, 0, 0, 0, 0, 0, 0} | 8 | 2 | 16 | | | | X |

Codewords are generated from appropriate permutations of the components of a few basic vectors called "Leaders" or "characteristic codebooks," and are distributed on the surface of respective spheres. "Sphere" indicates the size of a sphere, "Size" indicates a number of the codewords derived from permutation and combination of the leader, and "Ka" identifies the respective leaders, with each leader being identified by a different Ka value. The value of Sphere (S) is a quarter of the sum of all components of the leader each to the power of four, i.e.

$$S = \frac{1}{4}(x_1^4 + x_2^4 + \ldots + x_7^4 + x_8^4).$$

Each leader corresponds to an S having a different value. In the coding, each value of S corresponds to a value of Ka. In the case of an 8-dimensional vector, a corresponding Ka can be searched out with only the calculated value of S of the 8-dimensional vector, and thus a leader to which the value of S belongs may be determined from the value of Ka. The basic codebooks of the leaders are further shown in Table 1. The basic codebooks are divided into $Q_0$, $Q_2$, $Q_3$ and $Q_4$. The $Q_0$ contains only one leader, and the $Q_2$, $Q_3$, and $Q_4$ contain 3, 8 and 28 leaders respectively, where $Q_2 \subset Q_3$, and $Q_3 \subset Q_4$, as shown in Table 1.

After the basic codebook to which the $c_k$ belongs is determined, assuming that the $c_k$ is a sample from a set of elements $(a_0, a_1, \ldots, a_{q-1})$ and w(i) is the number of element $a_i$ in the sample, thus the number of possible states of Leader L is k(l) given as follows:

$$K(l) = C_n^{w_0} + \prod_{i=1}^{q-1} C_{n-\sum_{j=0}^{i-1} w_i}^{w_i} = \frac{n!}{\prod_{i=0}^{q-1} w_i!}$$

If d(k)=i, $x_k=a_i$, and $w_i^k$ is the number of element $a_i$ in $(x_0, x_1, \ldots, x_{n-1})$, an index of the $(x_0, x_1, \ldots, x_{n-1})$ is coded as follows:

$$t = \sum_{k=1}^{n} \frac{(n-1-k)}{\prod_{i=0}^{q-1} (w_i^k)!} \left( \sum_{j=0}^{d(k)-1} w_i^k \right)$$

In decoding, vector d(k) is obtained in sequence using the formula below, where k=0, . . . 7:

$$I(d(k)-1, k) \le t - \sum_{j=0}^{k-1} I(d(j)-1, j) < I(d(k), k)$$

$$I(p, k) = \frac{(n-1-k)!}{\prod_{l=0}^{q-1} (w_i^k)!} \sum_{j=0}^{p} w_j^k$$

Then $(x_0, x_1, \ldots, x_{n-1})$ is derived from d(k) based on that d(k)=i and $x_k=a_i$.

The above solution is disadvantageous at least in that multiple irregular factorials are calculated during coding and decoding, furthermore, the calculation of these random factorials can hardly be simplified by lookup process, resulting in high calculation complexity.

SUMMARY OF THE INVENTION

In one embodiment, the invention provides a vector coding method. The method includes decomposing an initial vector to obtain a sign vector and an initial absolute vector, wherein each respective vector has a plurality of elements. Coding the sign vector to obtain a sign code, performing multi-level permutation-based coding on the initial absolute vector to obtain an absolute vector code, and combining the sign code and the absolute vector code to obtain a code of the initial vector. The method further includes determining, before decomposing the initial vector, a characteristic codebook to which the initial vector belongs, obtaining a characteristic value of the characteristic codebook, and combining, after obtaining the code of the initial vector, the characteristic value and the code of the initial vector to obtain a final code of the initial vector.

In another embodiment, the invention further provides a vector coding method where the performing step includes removing from the plurality of elements of the initial absolute vector any element having an element value which satisfies a preset condition, constructing a new absolute vector with each of the plurality of elements not satisfying the preset condition, coding positions of each of the plurality of elements not satisfying the preset condition in the initial absolute vector to obtain a position code, proceeding with the multi-level permutation-based coding on the new absolute vector if the number of element values in the new absolute vector is larger than 1, and obtaining the absolute vector code by combining all the position codes obtained in the multi-level permutation-based coding if the number of element values in the new absolute vector is 1.

In yet another embodiment, the invention further provides a vector coding method where the performing step includes removing from the plurality of elements of the initial absolute vector any element having an element value which satisfies a preset condition, constructing a new absolute vector with each of the plurality of elements not satisfying the preset condition, coding positions of each of the plurality of elements not satisfying the preset condition in the initial absolute vector to obtain a position code, proceeding with the multi-level permutation-based coding on the new absolute vector if the number of element values in the new absolute vector is larger than 1, and obtaining the absolute vector code by combining all the position codes obtained in the multi-level permutation-based coding if the number of element values in the new absolute vector is 1.

In still another embodiment, the invention provides a vector coding apparatus. The apparatus includes a decomposing unit configured to decompose an initial vector into a sign vector and an initial absolute vector, a sign coding unit configured to obtain a sign code by coding the sign vector, a multi-level permutation-based coding unit configured to obtain an absolute vector code by performing multi-level permutation-based coding on the initial vector; and a combining unit configured to obtain an initial vector code by combining the sign code and the absolute vector code.

DETAILED DESCRIPTION OF ILLUSTRATIVE EMBODIMENTS

Embodiments of the present invention are described in details below illustratively with reference to the drawings for better understanding of objects, solutions and advantages of the present invention.

An embodiment in accordance with the present invention provides a vector coding/decoding method and apparatus and a stream media player, thereby reducing calculation complexity.

An embodiment in accordance with the present invention provides a vector coding method, including:

decomposing an initial vector to obtain a sign vector and an initial absolute vector;

coding the sign vector to obtain a sign code;

performing multi-level permutation-based coding on the initial absolute vector to obtain an absolute vector code; and combining the sign code and the absolute vector code to obtain a code of the initial vector.

An embodiment in accordance with the present invention provides a vector coding apparatus, including:

a decomposing unit, adapted to decompose an initial vector to obtain a sign vector and an initial absolute vector;

a sign coding unit, adapted to code the sign to obtain a sign code;

a multi-level permutation-based coding unit, adapted to perform multi-level permutation-based coding on the initial absolute vector to obtain an absolute vector code; and a combining unit, adapted to combine the sign code and the absolute vector code to obtain a code of the initial vector.

As can be seen from the above technical solution that no calculation using complex formula is performed to code absolute vector with multi-level permutation-based coding approach, so that calculation complexity is reduced.

Figure 1:
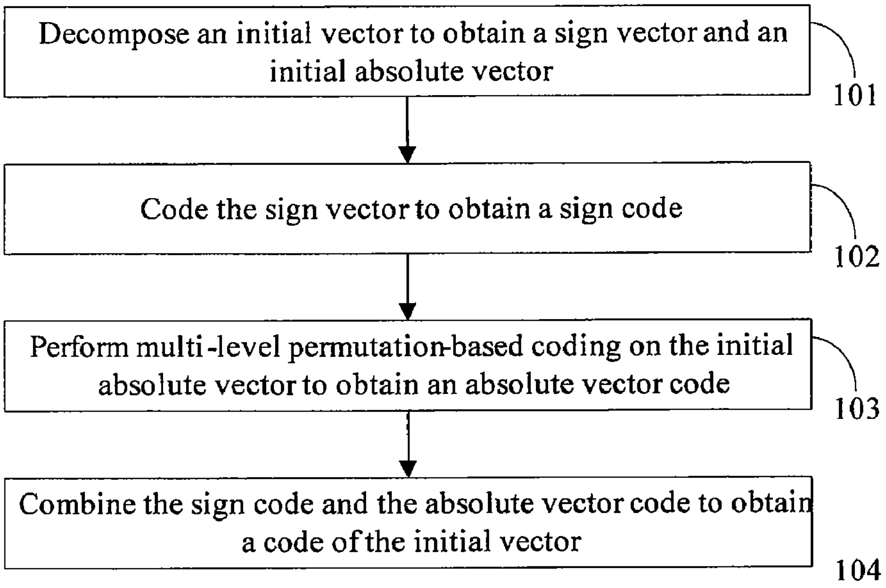
FIG. 1 is a flow chart of the vector coding method according to a first embodiment of the present invention.

As shown in FIG. 1, the vector coding method according to an embodiment of the present invention includes the following steps. It shall be noted that stream media in the description refer to multimedia applying streaming technologies, such as video and audio. For the sake of description, only audio is described in the description, and processes on other stream media such as video are similar to those on audio.

Step 101. An initial vector is decomposed to obtain a sign vector and an initial absolute vector.

A sign of an element in the initial vector may be positive or negative, and there are numerous possible combinations of the positive and negative signs. Therefore, by decomposing the initial vector to obtain the sign vector, the number of combinations of elements in the initial vector may be reduced, thereby reducing subsequent amount of calculation.

Step 102. A sign code is obtained by coding the sign vector.

A sign code of each of all the elements may be obtained from the decomposed initial vector. Alternatively, sign codes of only non-zero elements may be obtained after a sign of any zero element is removed, and thus data bits representing the integer value of the sign vector is reduced.

The integer value of the sign vector may be obtained using a process provided in an embodiment of the present invention. In the process, a sign of any element in the initial vector having a value of zero is removed from the sign vector, the signs of the non-zero elements are arranged in an order in which the non-zero elements are arranged in the initial vector, and thus a sign code is obtained, with "1" representing a positive sign and "0" representing a negative sign, or "0" representing the positive sign and "1" representing the negative sign, so that the sign code corresponding to the sign vector of the initial vector is obtained and the number of bits of the sign code equals to the number of the non-zero elements in the initial vector. As described above, while "1" and "0" are used in the case of binary, other values may be used in the case of, for example, octal, decimal, etc. The arrangement order in the description is described as from left to right. However in practice, the arrangement order may be from right to left or from middle to right and left, and processes are similar to those in the case of the arrangement order from left to right and description thereof are omitted herein.

Furthermore in practice, a post-process is performed regarding the sign code. Because a constraint exists in designing a basic codebook for a quantization process, a sum of values of all elements in a vector needs to be a multiple of 4. If a variance of the sum of values of all elements due to a change on a sign of any individual element is a multiple of 4, the signs of the individual elements are independent; otherwise, the signs of the individual elements are dependent, which means that correlation and redundancy between the signs exists, and the redundancy between the signs needs to be eliminated for the purpose of efficient coding. Because any dependent sign of the initial vector may be determined by other sign bits, a simple approach of eliminating redundancy is not to code the sign of the last non-zero element of the initial vector among the dependent signs, i.e. to remove the last bit of the obtained sign code, so as to satisfy the condition that a sum of values of all elements in a vector needs to be a multiple of 4. The sign of the remaining one element may be derived directly from known signs of other elements of the vector.

Step 103. Multi-level permutation-based coding is performed on the initial absolute vector to obtain an absolute vector code.

The multi-level permutation-based coding removes level by level an element of the initial absolute vector which satisfies a preset condition, for example, an element corresponding to the most frequent element value. If two or more most frequent element values are present, corresponding elements may be removed in order of their values. Of course, the elements may also be selected and removed using other means depending on specific application environment. In practice, all elements corresponding to two or more most frequent element values may be removed.

In multi-level permutation-based coding, for elements remaining at the current level, data on their positions at an upper level constitutes a position permutation, a possible value of the position permutation is the number of elements belonging to the upper level, and the obtained position permutation at the current level is coded. In this way, the multi-level permutation-based coding is performed on the absolute vector until an element at the decomposition level corresponds to only one element value, as a result, a series of level-based coded values are obtained and the absolute vector code is obtained by combining the level-based coded values. In practice, in the multi-level permutation-based coding, the level-based coded values may be combined level by level, or combined at a time after all the level-based coded values are obtained. In the description of the present invention hereinafter, the way that the level-based coded values are combined level by level is taken as an example for illustration.

Step 104. The sign code and the absolute vector code are combined to obtain a code of the initial vector.

The code of the initial vector may be obtained by combining the sign code and the absolute vector code, so that in decoding, the absolute vector and the sign vector of elements of the absolute vector can be decoded from the code of the initial vector. A specific combination process includes: after determining the number of bits of the sign code, combining the absolute vector code shifted left by the number and the sign code, thereby obtaining the code of the initial vector.

In practice, it is also possible to combine the absolute vector code shifted right and the sign code. Alternatively, it is possible to combine the sign code shifted left or right and the absolute vector code after the number of bits of the absolute vector code is determined. Embodiments of the present invention are not limited to a particular approach of combining the absolute vector code and the sign code, and all approaches of deriving a sign code and an absolute vector code from a code of an initial vector in decoding are intended to fall within the scope of the present invention.

As can be seen from the above description that no calculation using complex formula is performed to code absolute vector with multi-level permutation-based coding approach in embodiments of the present invention, so that calculation complexity is reduced.

In practice, multiple characteristic codebooks may be present, in other words, at least two characteristic codebooks exist in the codebook space. In this case, after a coded value of the initial vector, which belongs to a characteristic codebook, is obtained, further processing can include:

obtaining a characteristic value of the characteristic codebook to which the initial vector belongs in the codebook space, combining the characteristic value and the code of the initial vector which belongs to the characteristic codebook, and obtaining a resulting code of the initial vector.

Characteristic values of the individual characteristic codebooks in the codebook space are different, and the characteristic value may be an entirely shifted value of the characteristic codebook in the codebook space, or other value which may uniquely identify the characteristic codebook in the codebook space, such as a serial number of the characteristic codebook. Accordingly, by combining the code of the initial vector which belongs to the characteristic codebook and the characteristic value, the code is mapped to characteristic codebook, so that the corresponding codebook may be used for decoding. The specific procedure of the combination is same as that of combining an integer value of a sign vector and a code of an initial vector. In practice, when an entirely shifted value of a characteristic codebook in the codebook space is used as the characteristic value, due to an interval between entirely shifted values of the respective characteristic codebooks in the codebook space, a final coded value may be obtained by adding the code of the initial vector which belongs to the characteristic codebook and the entirely shifted value if the interval is sufficiently large.

After the above steps, an initial vector may be mapped to a corresponding characteristic codebook in the case of multiple characteristic codebooks.

When the method according to an embodiment of the present invention is deployed in a transform-domain lattice vector quantization coding in a speech audio standard, due to that all basic codebooks for the lattice vector quantization coding are constant, element types of each Leader and the number of elements of each type are determined, and an order of multi-level permutation-based coding, configuration parameters, etc., may be determined in advance according to the Leader. In the case of the codebook of the basic codebooks shown in Table 1, for example, the order of multi-level permutation-based coding and the configuration parameters according to an embodiment of the present invention are shown in Table 2, where an element corresponding to the most frequent element value is removed level by level.

TABLE 2

| Order of multi-level permutation-based coding and configuration parameters | | | |
|---|---|---|---|
| Ka | Leader | Decomposition order | Sn, Vc, m1, m2, m3 |
| | {0, 0, 0, 0, 0, 0, 0, 0} | | |
| 0 | {1, 1, 1, 1, 1, 1, 1, 1} | {1} | {7, 1} |
| 1 | {2, 2, 0, 0, 0, 0, 0, 0} | {0, 2} | {2, 2, 2} |
| 2 | {2, 2, 2, 2, 0, 0, 0, 0} | {0, 2} | {4, 2, 4} |
| 3 | {3, 1, 1, 1, 1, 1, 1, 1} | {1, 3} | {7, 2, 1} |
| 4 | {4, 0, 0, 0, 0, 0, 0, 0} | {0, 4} | {1, 2, 1} |
| 5 | {2, 2, 2, 2, 2, 2, 0, 0} | {2, 0} | {6, 2, 2} |
| 6 | {3, 3, 1, 1, 1, 1, 1, 1} | {1, 3} | {7, 2, 2} |
| 7 | {4, 2, 2, 0, 0, 0, 0, 0} | {0, 2, 4} | {3, 3, 3, 1} |
| 8 | {2, 2, 2, 2, 2, 2, 2, 2} | {2} | {8, 1} |
| 9 | {3, 3, 3, 1, 1, 1, 1, 1} | {1, 3} | {7, 2, 3} |
| 10 | {4, 2, 2, 2, 2, 0, 0, 0} | {2, 0, 4} | {5, 3, 4, 1} |
| 11 | {4, 4, 0, 0, 0, 0, 0, 0} | {0, 4} | {2, 2, 2} |
| 12 | {5, 1, 1, 1, 1, 1, 1, 1} | {1, 5} | {7, 2, 1} |
| 13 | {3, 3, 3, 3, 1, 1, 1, 1} | {1, 3} | {7, 2, 4} |
| 14 | {4, 2, 2, 2, 2, 2, 2, 0} | {2, 0, 4} | {7, 3, 2, 1} |
| 15 | {4, 4, 2, 2, 0, 0, 0, 0} | {0, 2, 4} | {4, 3, 4, 2} |
| 16 | {5, 3, 1, 1, 1, 1, 1, 1} | {1, 3, 5} | {7, 3, 2, 1} |
| 17 | {6, 2, 0, 0, 0, 0, 0, 0} | {0, 2, 6} | {2, 3, 2, 1} |
| 18 | {4, 4, 4, 0, 0, 0, 0, 0} | {0, 4} | {3, 2, 3} |
| 19 | {6, 2, 2, 2, 0, 0, 0, 0} | {0, 2, 6} | {4, 3, 4, 1} |
| 20 | {6, 4, 2, 0, 0, 0, 0, 0} | {0, 2, 4, 6} | {3, 4, 3, 2, 1} |
| 21 | {7, 7, 1, 1, 1, 1, 1, 1} | {1, 7} | {7, 2, 1} |
| 22 | {8, 0, 0, 0, 0, 0, 0, 0} | {0, 8} | {1, 2, 1} |
| 23 | {6, 6, 0, 0, 0, 0, 0, 0} | {0, 6} | {2, 2, 2} |
| 24 | {8, 2, 2, 0, 0, 0, 0, 0} | {0, 2, 8} | {3, 3, 3, 1} |
| 25 | {8, 4, 0, 0, 0, 0, 0, 0} | {0, 4, 8} | {2, 3, 2, 1} |
| 26 | {9, 1, 1, 1, 1, 1, 1, 1} | {1, 9} | {7, 2, 1} |
| 27 | {10, 2, 0, 0, 0, 0, 0, 0} | {0, 2, 10} | {2, 3, 2, 1} |
| 28 | {8, 8, 0, 0, 0, 0, 0, 0} | {0, 8} | {2, 2, 2} |
| 29 | {10, 6, 0, 0, 0, 0, 0, 0} | {0, 6, 10} | {2, 3, 2, 1} |
| 30 | {12, 0, 0, 0, 0, 0, 0, 0} | {0, 12} | {1, 2, 1} |
| 31 | {12, 4, 0, 0, 0, 0, 0, 0} | {0, 4, 12} | {2, 3, 2, 1} |
| 32 | {10, 10, 0, 0, 0, 0, 0, 0} | {0, 10} | {2, 2, 2} |
| 33 | {14, 2, 0, 0, 0, 0, 0, 0} | {0, 2, 14} | {2, 3, 2, 1} |
| 34 | {12, 8, 0, 0, 0, 0, 0, 0} | {0, 8, 12} | {2, 3, 2, 1} |
| 35 | {16, 0, 0, 0, 0, 0, 0, 0} | {0, 16} | {1, 2, 1} |

Table 2 shows a decomposition order corresponding to each Leader, i.e. element values removed level by level, as shown in the column of decomposition order. Each element in the Leader is removed level by level based on a value of the element in accordance with data in the column of decomposition order from left to right. Data of m1, m2 and m3 in the last column denote respectively values of numbers (m) of elements for permutation-based coding at levels 1, 2 and 3, m at an upper level equals to a value of a number (n) of elements at the current level, and a value of n of the permutation-based coding at the first level is a dimension of the lattice vector (for example, n is 8 for $RE_8$). Data Vc in the last column denotes the number of element types in the terms of an absolute value in the Leader, i.e. the number of levels of the multi-level permutation-based coding. Data Sn in the last column denotes the number of bits of a sign code.

Figure 2:
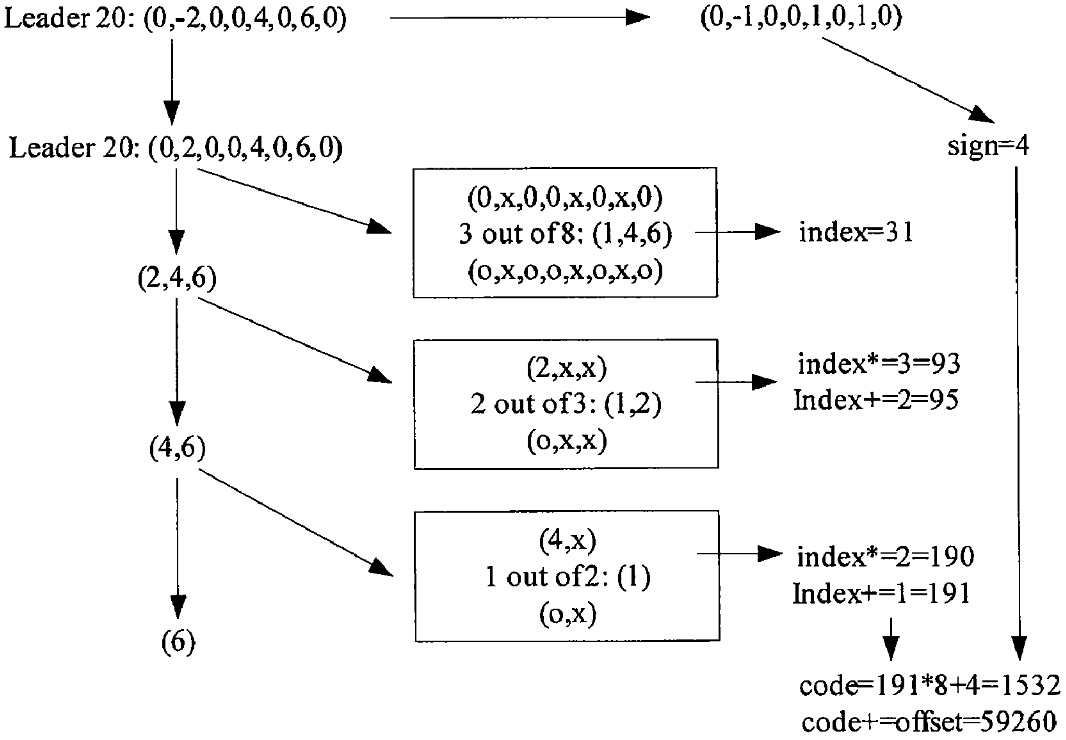
FIG. 2 is a flow chart of the vector coding method according to a second embodiment of the present invention.

The vector coding method according to an embodiment of the present invention is described below in a specific embodiment. As shown in FIG. 2, calculated data at each stage of the vector coding belonging to Leader 20 is described.

By decomposing elements in vector of (0, −2, 0, 0, 4, 0, 6, 0) belonging to Leader 20, an absolute vector of (0, 2, 0, 0, 4, 0, 6, 0) and a sign vector of (0, −1, 0, 0, 1, 0, 1, 0) are obtained.

After 0s are removed from the sign vector, a binary sign code of 100 is obtained with "1" representing the negative sign and "0" representing the positive sign. The binary 100 is a decimal 4, thus the sign code Sign=4.

Figure 3A:
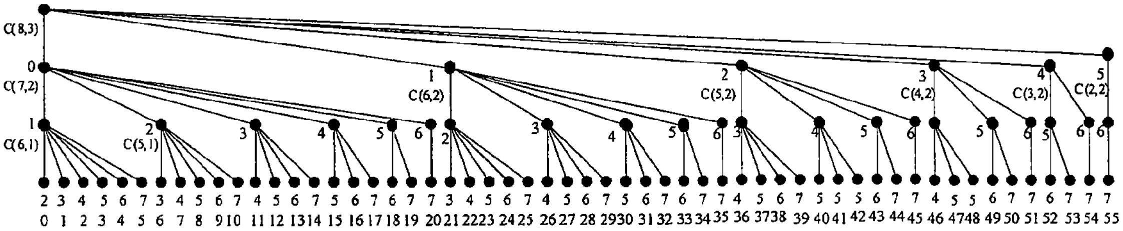
FIG. 3*a* is a schematic diagram of an example of position code table of index83 according to an embodiment of the present invention.

With reference to Table 2, to perform multi-level permutation-based coding on the absolute vector, elements having a value of 0 in the absolute vector are removed to obtain an absolute vector of (2, 4, 6). For the elements of 2, 4 and 6, data on their positions at an upper level are 1, 4 and 6 respectively. In this case, three elements are selected from eight elements in accordance with a combination principle, and a corresponding position code may be calculated with a preset formula, i.e. $index83=C_8^3-C_{8-p0}^3+C_{8-p0-1}^2-C_{8-p1}^2+C_{8-p1-1}^1-C_{8-p2}^1$, where p0 denotes the position data of "2", p1 denotes the position data of "4", and p2 denotes the position data of "6". Alternatively, the position code may be searched out from a preset position code table, an example of which in an embodiment of the present invention is shown in FIG. 3*a*. The position code corresponding to the respective position data of 1, 4 and 6 is 31, as can be seen from FIG. 3*a*.

Figure 3B:
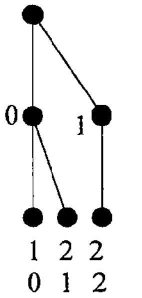
FIG. 3*b* is a schematic diagram of an example of position code table of index32 according to an embodiment of the present invention.

Subsequently, the multi-level permutation-based coding proceeds with the obtained absolute vector which has three elements. Because the three elements correspond to three different element values, one element is removed from the three elements in order. With reference to Table 2, an element having a value of 2 is removed, obtaining an absolute vector of (4, 6) having two elements. Because the position code at the upper level is 31, a combined position code of 31*3+2=95 is obtained by combining the position code at the current level and the position code at the upper level. The reason for timing 3 is that the number of combinations obtained from selecting two elements from three elements is 3, and the reason for adding 2 is that the data of positions in the vector of (2, 4, 6) for the elements of 4 and 6 from the obtained absolute vector of (4, 6) is 1 and 2 and a position code of 2 is obtained in accordance with a formula of $index32=C_3^2-C_{3-p0}^2+C_{3-p0-1}^1-C_{3-p1}^1$, where p0 denotes the position data of the element of "4", and p1 denotes the position data of the element of "6". Of course, the position code may be also searched out from a preset position code table, an example of which in an embodiment of the present invention is shown in FIG. 3*b*. The position code corresponding to the respective position data of 1 and 2 is 2, as can be seen from FIG. 3*b*.

Likewise, the multi-level permutation-based coding is proceeded with on the obtained absolute vector which has two elements. With reference to Table 2, an element having a value of 4 is removed, obtaining an absolute vector of (6) having only one element. The position code at the upper level is 95, the number of combinations obtained from selecting one element from two elements is 2, and the data on position in the vector of (4, 6) for the element of 6 is 1, therefore a position code of 1 is obtained in accordance with a formula of $index21=C_2^1-C_{2-p0}^1$, where p0 denotes the data on position in the vector of (4, 6) for the element of "6". As a result, the combined position code is 95*2+1=191.

At this point, the multi-level permutation-based coding is completed because the number of element values in the obtained absolute vector is 1. Because the number of non-zero elements among initial elements in the absolute vector is 3, in other words, the number of bits of the integer value of the sign vector is 3, in order to combine the sign code and the absolute vector code, the absolute vector code is shifted left by 3 bits and added to the sign code, so that the absolute vector code and the sign code are combined and stored, and a coded value of the initial vector which belongs to Leader 20 is obtained as 191*(23)+4=191*8+4=1532, where 4 is the sign code. Subsequently, the code belonging to Leader 20 and the entirely shifted value of Leader 20 in the codebook space are combined, and the obtained final coded value is 59260 given that the entirely shifted value of Leader 20 in the codebook space is 57728. The entirely shifted value of Leader 20 in the codebook space is dependent upon the storage position of Leader 20 in a system, and may vary from system to system, but is constant in a system.

As can be seen from the above description that no complex factorial is calculated and amount of calculation is low. Furthermore, it is required to store only a table shown as Table 2, formulas for calculating a position code or a position code table used in searching for a position code, and a little of temporal data in an embodiment, therefore not much storage space is occupied. In the embodiment, any element corresponding to one element value are removed at each level; however in practice with many element values, elements corresponding to multiple element values may be removed at each level.

Figure 4:
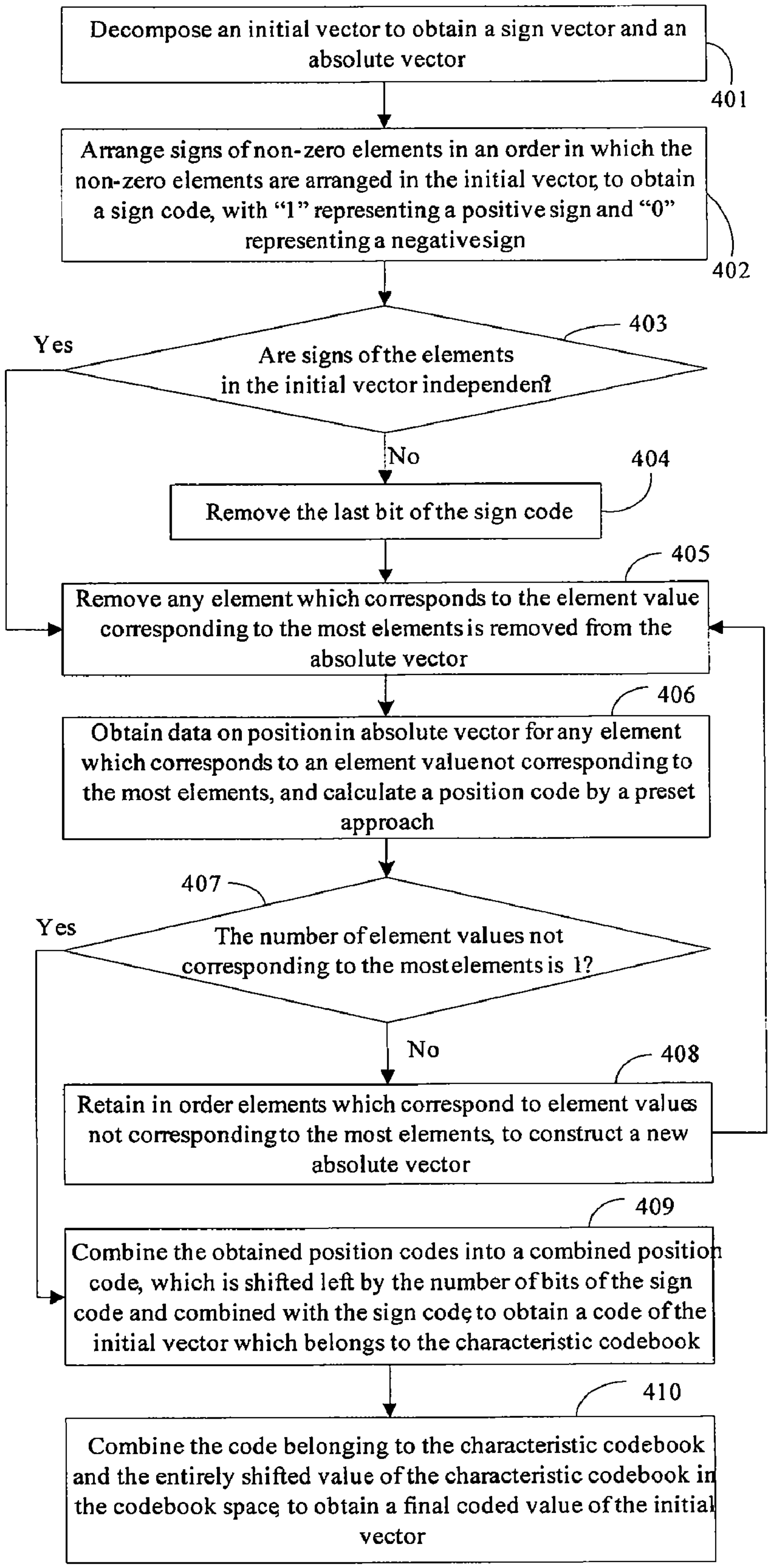
FIG. 4 is a flow chart of the vector coding method according to a third embodiment of the present invention.

The method according to the third embodiment of the present invention is shown in FIG. 4, and the method includes the following steps.

Step 401. A sign vector and an absolute vector are obtained by decomposing an initial vector.

Step 402. The signs of non-zero elements are arranged in an order in which the non-zero elements are arranged in the initial vector, and thus a sign code is obtained, with "1" representing the positive sign and "0" representing the negative sign.

In practice, the sign code may be obtained with "0" representing the positive sign and "1" representing the negative sign, or otherwise.

Step 403. It is determined whether the signs of the elements in the initial vector are independent. If the signs are independent, the method proceeds to Step 405, otherwise the method proceeds to Step 404.

Step 404. The last bit of the sign code is removed.

Step 405. Any element which corresponds to the element value corresponding to the most elements is removed form the absolute vector.

In the embodiment, an approach that any element which corresponds to the element value corresponding to the most elements is removed from the absolute vector is deployed. However in practice, an approach that any element which corresponds to the element value corresponding to the least elements is removed from the absolute vector may be deployed.

Step 406. For elements which correspond to element values not corresponding to the most elements, their data on the positions in the absolute vector is obtained, and a position code is obtained by a preset approach.

The preset approach may be that the position code is calculated using a formula for calculating a position code or searched out in a preset position code table.

Step 407. It is determined whether the number of element values not corresponding to the most elements is 1; and if the number is 1, the process proceeds to Step 409; otherwise, the process proceeds to Step 408.

Step 408. Elements corresponding to element values not corresponding to the most elements are retained in order, to construct a new absolute vector, and the process proceeds to Step 405.

Step 409. The obtained position codes are combined into a combined position code, which is shifted left by the number of bits of the sign code and combined with the sign code, to obtain a code of the initial vector which belongs to the characteristic codebook determined from the initial vector.

Step 410. The code belonging to the characteristic codebook and the entirely shifted value of the characteristic codebook in the codebook space are combined, to obtain a final coded value of the initial vector.

The multi-level permutation-based coding is deployed in the embodiment, no complex factorial is calculated and amount of calculation is low. Furthermore, not much temporal data is required to be stored in the embodiment, and therefore not much storage space is occupied.

A vector decoding method corresponding to the vector coding method is provided in an embodiment of the present invention. After receiving the resulting code of an initial vector, a decoding side decomposes a value to be decoded in accordance with an approach opposite to the coding, obtains permutation-based decoding values of the respective parts, obtains position information by decoding, and multi-level replacement is performed, to obtain the resulting initial vector. The decoding includes: (1) searching the range of the coded value to obtain a Leader to which the lattice vector belongs, thereby obtaining a shift value of the code, and subtracting the shift value from the coded value to obtain a coded value in the Leader; (2) decomposing the coded value in the Leader, to obtain a value of sign code and a value of multi-level permutation-based code; (3) decomposing level by level the value of multi-level permutation-based code to obtain values of permutation-based code at each level, obtaining position vectors at each level through parse using a permutation-based decoding module, and restoring element values at all positions in the initial vector using multi-level replacement approach.

Figure 5:
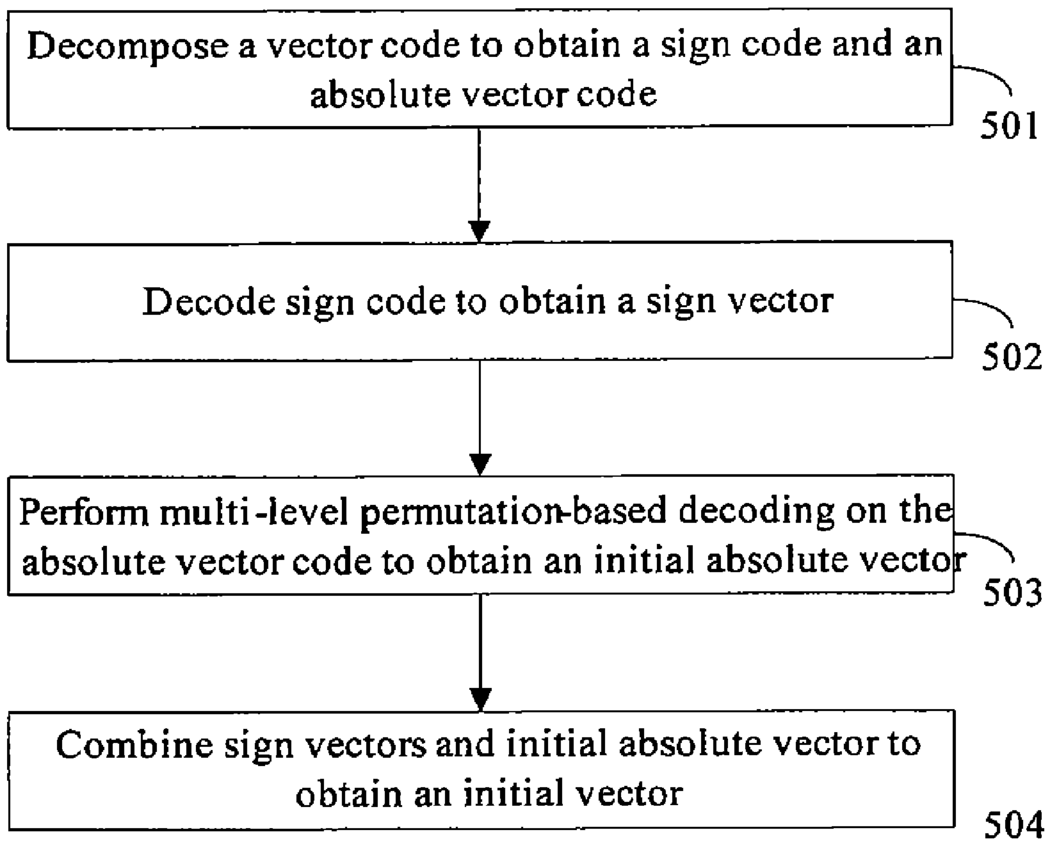
FIG. 5 is a flow chart of the vector decoding method according to a first embodiment of the present invention.

As shown in FIG. 5, the vector decoding method according to an embodiment of the present invention includes:

Step 501. A vector code is decomposed, to obtain a sign code and an absolute vector code.

A characteristic codebook corresponding to the vector may be obtained from the vector code, and the number of bits of the sign code corresponding to the vector code may be searched out from a preset decoding table.

The sign code indicates signs of elements in the initial vector. The number of elements in each characteristic codebook is known, therefore the number of bits of the sign code is determined from the determined characteristic codebook, and all of these may be stored in the preset decoding table.

Data on bits of a sign code is extracted from the vector code, to obtain the sign code. Due to that the vector code is constructed by the absolute vector code and the sign code jointly, if the coded value of the characteristic codebook is obtained from combining the absolute vector code shifted left and the sign code in coding, the several most right bits of the vector code is the sign code To obtain the absolute vector code, the vector code from which the data on the bits of the sign code has been extracted is shifted right by the number of bits of the sign code. After the sign code is extracted, the data from which the sign code has been extracted is shifted right by the number of bits, thereby obtaining the absolute vector code, which is inverse to the procedure of coding.

Step 502. The sign code is decoded to obtain a sign vector.

The obtained integer value of sign vector is converted as binary. The signs of elements are determined dependent upon whether "0" represents the positive sign and "1" represents the negative sign or "0" represents the negative sign and "1" represents the positive sign in coding. In this embodiment, the sign code is described as being determined from the signs of non-zero elements.

Step 503. Multi-level permutation-based decoding is performed on the absolute vector code, to obtain an initial absolute vector.

A specific procedure of the multi-level permutation-based decoding includes the following.

The absolute vector value is decomposed, to obtain position codes of elements from the absolute vector at the upper-level absolute vector. The absolute vector code includes position codes obtained in the multi-level permutation-based coding, thus the position codes related the respective levels may be obtained by decomposing directly the absolute vector code in decoding.

The position codes are decoded, thereby obtaining data on positions at the upper-level absolute vector for elements from the absolute vector.

The number of elements of the absolute vector at the upper level, and any element value of elements removed for obtaining the absolute vector are searched out from the preset decoding table.

The elements of the absolute vector are arranged in the absolute vector at the upper level in accordance with the data on position, and the element value of the removed elements is provided at the remaining position, so that the absolute vector at the upper level is obtained.

If the absolute vector at the upper level is not the initial absolute vector, the method proceeds with the multi-level permutation-based decoding in accordance with the steps above, until the initial absolute vector is obtained.

Step 504. The sign vector and the initial absolute vector are combined, thereby obtaining an initial vector.

Particularly, the signs are provided in order of the non-zero elements in the initial absolute vector.

It is possible that the last bit of the sign code is removed in coding due to the dependency of the signs of elements, therefore in reconstructing the initial vector, if the most right non-zero element of the initial vector is provided with no element sign, an element sign of the most right non-zero element may be determined in accordance with the principle that the sum of values of all elements in the initial vector is a multiple of 4. Of course, it is also possible that the most left non-zero element of the initial vector is provided with no element sign, depending on the non-zero element of which the sign is removed in coding.

As can be seen from this embodiment, no irregular factorial is calculated and amount of calculation is low in decoding using the solution according to the embodiment. Furthermore, the temporal data is similar with that for coding, and therefore not much storage space is occupied.

In practice, if the obtained code is a final code combined with a characteristic value of the characteristic codebook in the codebook space, the final code is decomposed with the following steps:

determining a characteristic codebook corresponding to the initial vector from the final code of the initial vector, thereby obtaining a characteristic value of the characteristic codebook in the codebook space; and determining a vector code of the initial vector which belongs to the characteristic codebook from the final code and the characteristic value.

The characteristic value may be an entirely shifted value. Due to that a storage position of each characteristic codebook in the codebook space is fixed, the entirely shifted value of the characteristic codebook in the codebook space is fixed, and the characteristic codebook where the coded value is may be determined from the range where the coded value is after the code is obtained. Particularly, a table, in which each characteristic codebook and its shift value are recorded, may be stored in a system. The table may be searched for decoding. Likewise, a similar process is performed for the case where the characteristic value is a serial number of the characteristic codebook.

Particularly, if the code is obtained by adding a code of the vector which belongs to the characteristic codebook and the entirely shifted value in coding, the coded value belonging to the characteristic codebook may be obtained by subtracting the entirely shifted value from the code.

With the above steps, the code of the vector which belongs to the characteristic codebook may be obtained by decomposing the final code, thereby decomposing the coded value of the vector which belongs to the characteristic codebook to obtain the initial vector.

Figure 6:
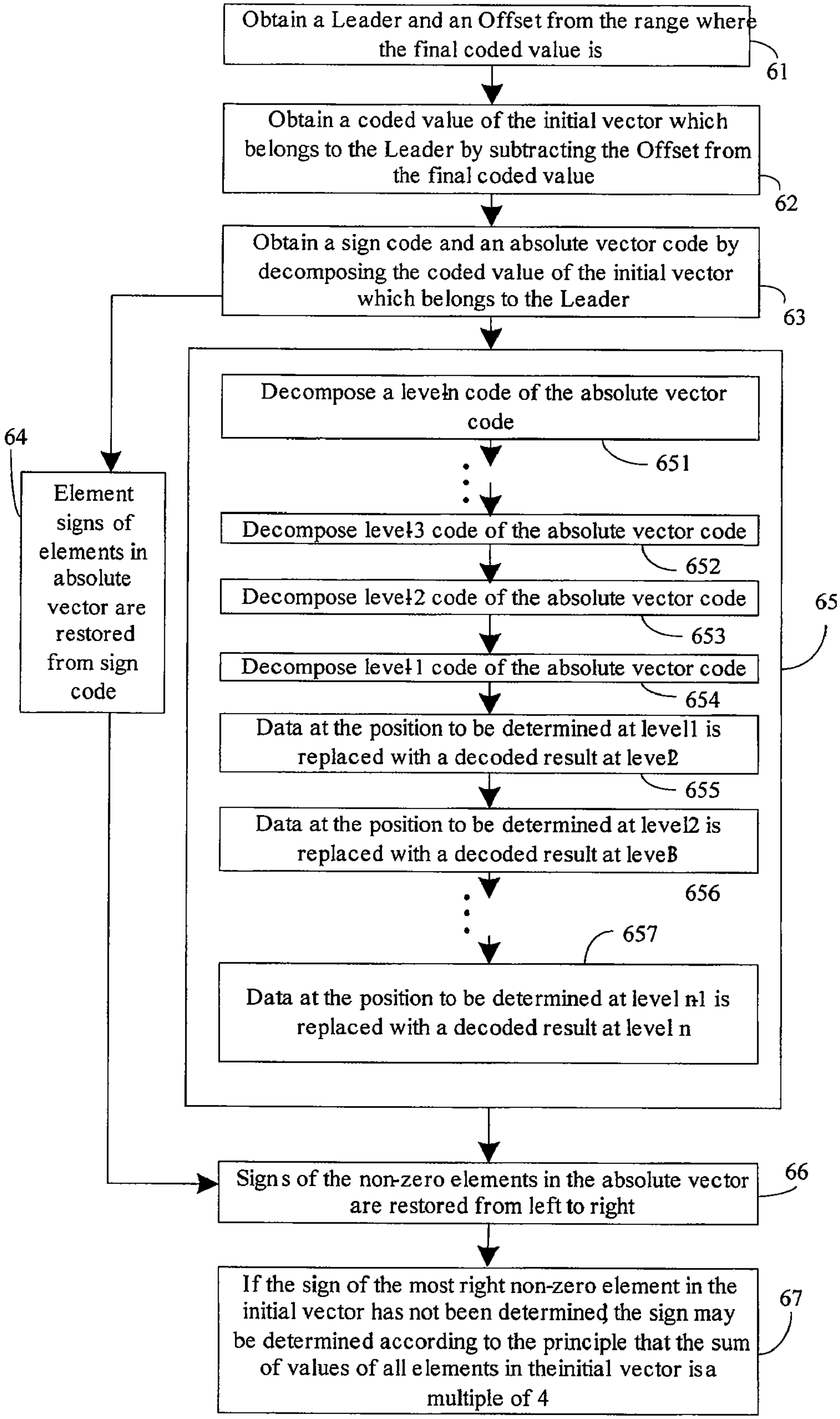
FIG. 6 is a flow chart of the vector decoding method according to a second embodiment of the present invention.

The vector decoding method according to the second embodiment of the present invention is shown in FIG. 6, and includes the following.

Step 61. A Leader and an Offset are obtained from the range where the final coded value is.

Given the coded value of 59260, it may be determined that the coded value belongs to Leader 20, and the Offset is 57728.

Step 62. A coded value of the initial vector which belongs to the Leader may be obtained by subtracting the Offset from the final coded value.

A coded value of 1532 which belongs to Leader 20 is obtained by subtracting 57728 from 59260.

Step 63. A sign code and an absolute vector code are obtained by decomposing the coded value of the initial vector which belongs to the Leader.

A sign code of 4 and an absolute vector code of 1528 are obtained by decomposing 1532.

Step 64. Element signs of elements in the absolute vector are restored from the sign code.

A decimal 4 is converted to a binary 100 given that "1" represents the negative sign and "0" represents the positive sign in coding, therefore element signs corresponding to the non-zero elements indicate respectively "−", "+" and "+" from left to right.

Step 65. Multi-level permutation-based decoding is performed, which includes:

Step 651. A level-n code of the absolute vector code is decomposed.

The n indicates the number of levels of the multi-level permutation-based coding used in coding. The value of n may vary with different characteristic codebook, and may be obtained directly from item Vc in Table 2.

This embodiment is described taking Leader 20 as an example. As can be seen from Table 2, there are 4 levels, any element having an element value of 0 is removed at level 1, any element having an element value of 2 is removed at level 2, and any element having an element value of 4 is removed at level 3, as a result, the level 4 has an element having a value of 6. It will be noted that sign bits of the absolute vector code are shifted right by 3 bits (corresponding to the shift by 3 bits in coding) before decomposition, and obtains 191 from 1528/$(2^3)$=1528/8.

Step 652. The level-3 code of the absolute vector code is decomposed.

For example, in the case of Leader 20, there are 4 levels, but decomposition will not be carried out at the level 4, and only 3 levels of permutation-based coding are carried out for Leader 20, accordingly, the decoding starts with the level 3. Because any element corresponding to one element value is removed at each level during the coding, any element corresponding to one element value is restored correspondingly at each level during decoding. As can be seen from Table 2 that m3 is 1, m2 is 2 and m1 is 3, the number of combinations obtained from selecting elements the number of which is the number of elements at level 2 from elements the number of which is the number of elements at level 3, i.e. 1 out of 2, is 2. Therefore, according to a calculation of 191±2, the obtained quotient is 95, which is a permutation-based position code for levels 1 and 2, the remainder is 1, which is a position code of an element from the absolute vector at level 3 at the absolute vector at level 2, and position data corresponding to the position code is 1.

Step 653. The level-2 code of the absolute vector code is decomposed.

Similarly, according to a calculation of 95±3, the obtained position code for level 1 is 31, the remainder is 2, which is a position code of an element from the absolute vector at level 2 at the absolute vector at level 1, and position data corresponding to the position code is 1 and 2.

Step 654. The level-1 code of the absolute vector code is decomposed.

Because the level 1 is the last level, a position code of an element from the level-1 absolute vector at the initial vector is obtained. Further, m1 is 3 and the number of bits of the initial data is 8, thus position data of 1, 4 and 6 which corresponds to the position code of 31 is searched out from the table shown in FIG. 3*a*. It will be appreciated that the position data may be also calculated with a formula.

Step 655. Data at the position to be determined at the level 1 is replaced with a decoded result at the level 2.

As shown in Table 2, the element value removed first is 0, thus 0 is set at positions in the absolute vector other than positions 1, 4 and 6.

Step 656. Data at the position to be determined at the level 2 is replaced with a decoded result at the level 3.

As shown in Table 2, the element value removed secondly is 2, and positions 4 and 6 among the positions 1, 4 and 6 in the absolute vector is retained at the lower level, thus the element value of 2 is provided at the position 1.

Accordingly, the element value of 4 is provided at the position 4 and the element value of 6 is provided at the position 6, thereby obtaining the initial absolute vector of (0, 2, 0, 0, 4, 0, 6, 0).

No step for levels 4 to n is carried out because decoding for 3 levels only is required for Leader 20. In practice, for a certain Leader corresponding to many levels, process for each level is similar, and description thereof is omitted herein.

Step 657. Data at the position to be determined at the level n−1 is replaced with a decoded result at the level n.

Step 66. Signs of the non-zero elements in the absolute vector are restored from left to right.

The obtained signs of the non-zero elements are respectively "−", "+" and "+" from left to right, thus an initial vector of (0, −2, 0, 0, 4, 0, 6, 0) is obtained.

Step 67. If the sign of the most right non-zero element in the initial vector has not been determined, the sign of this non-zero element may be determined according to the principle that the sum of values of all elements in the initial vector is a multiple of 4.

In practice, it is possible that the sign bit for the most right non-zero element is removed due to the dependency of the signs of initial vector, therefore in decoding, if the most right non-zero element of the obtained initial vector is provided with no sign value, the sign of the most right non-zero element may be determined in accordance with the principle that the sum of values of all elements in the initial vector is a multiple of 4.

As can be seen in the embodiment, no irregular factorial is calculated and amount of calculation is low in decoding using the solution according to the embodiment. Furthermore, the temporal data is similar with that for coding, and therefore not much storage space is occupied.

Figure 7:
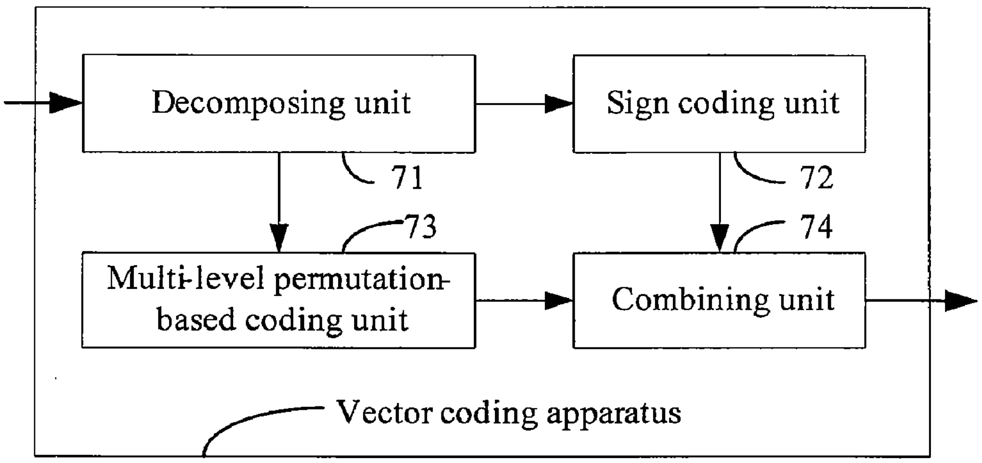
FIG. 7 is a structural diagram illustrating an example of the vector coding apparatus according to an embodiment of the present invention.

A vector coding apparatus according to an embodiment of the present invention is provided, as shown in FIG. 7, and the apparatus includes:

a decomposing unit 71, adapted for decomposing an initial vector to obtain a sign vector and an initial absolute vector;

a sign coding unit 72, adapted for coding the sign to obtain a sign code;

a multi-level permutation-based coding unit 73, adapted for performing multi-level permutation-based coding on the initial absolute vector to obtain an absolute vector code. The multi-level permutation-based coding unit 73 may include: an element removing unit adapted for removing an element of the initial absolute vector which has a value satisfying a preset condition; an element retaining unit adapted for retaining in order any element not satisfying the preset condition to construct a new absolute vector; a position coding unit adapted for coding the position of the element not satisfying the preset condition in the initial absolute vector to obtain a position code, and triggering the element removing unit to remove any element in the new absolute vector of which the element value does not satisfy the preset condition if the number of the element values in the new absolute vector is larger than 1; and an absolute vector code unit adapted for combining the individual position codes obtained in multi-level permutation-based coding to obtain an absolute vector code if the number of the element values in the new absolute vector is larger than 1;

where the position coding unit may calculate the position code with a preset position code calculating formula, or search a preset position code table for the position code. In practice, the multi-level permutation-based coding unit 73 may further include a preset code table storage unit adapted for storing the preset code table in which the preset condition is stored, and the element removing unit searches the preset code table for any element to be removed; and a combining unit 74, adapted for combining the sign code and the absolute vector code to obtain an initial vector code; The combining unit 74 may include: a bit number determining unit adapted for determining the number of bits of a sign code; and a combining unit adapted for shifting left the absolute vector code by the number of bits of the sign code and combining the sign code to obtain the initial vector code.

As can be seen, the absolute vector is coded using an approach of multi-level permutation-based coding in the embodiment, so that no calculation with complex formulas is conducted, and computation complexity is lowered.

In practice, if the number of characteristic codebook in a codebook space is at least two, the code of the initial vector is mapped to the characteristic codebook. To this end, the vector coding apparatus according to the embodiment of the present invention further includes:

a characteristic codebook determining unit adapted for determining a characteristic codebook to which the initial vector belongs; and a final coded value obtaining unit adapted for obtaining a characteristic value of the characteristic codebook and combining the characteristic value and the code of the initial vector to obtain a final code of the initial vector.

The final coded value obtaining unit may be used to map the initial vector to a corresponding characteristic codebook if multiple characteristic codebooks are present.

Figure 8:
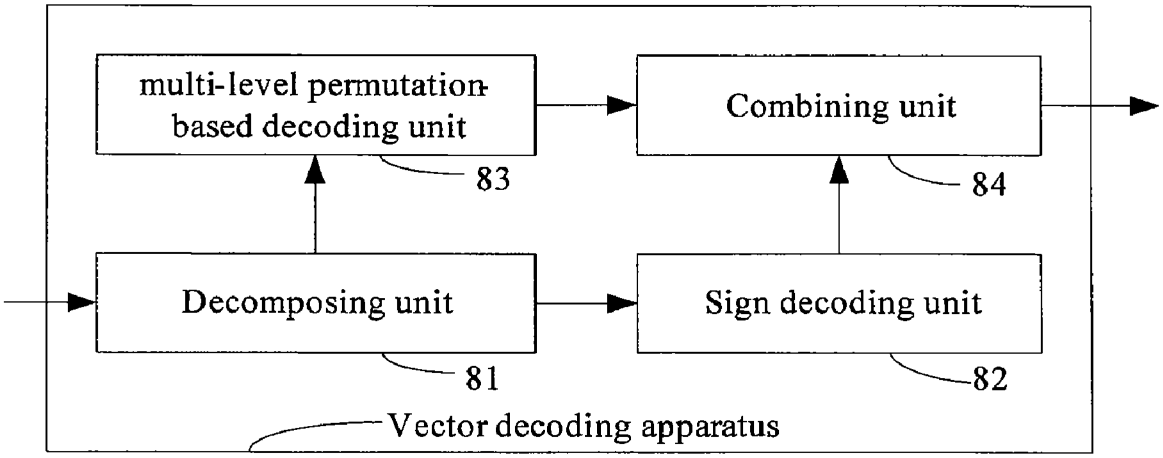
FIG. 8 is a structural diagram illustrating an example of the vector decoding apparatus according to an embodiment of the present invention.

A vector decoding apparatus according to an embodiment of the present invention is provided, as shown in FIG. 8, and the apparatus includes:

a decomposing unit 81 adapted for decomposing a vector code to obtain a sign code and an absolute vector code;

where the decomposing unit 81 may include: a sign code bit number determining unit adapted for determining the number of bits of a sign code from a characteristic codebook to which the initial vector belongs; a sign code extracting unit adapted for extracting data on bits of the sign code from the vector code to obtain the sign code; and an absolute vector code obtaining unit adapted for shifting right the vector code from which the data on the bits of the sign code has been extracted by the number of bits of the sign code to obtain an absolute vector code;

a sign decoding unit 82 adapted for decoding the sign code to obtain a sign vector;

a multi-level permutation-based decoding unit 83 adapted for performing multi-level permutation-based decoding on the absolute vector code to obtain an initial absolute vector;

where the multi-level permutation-based decoding unit 83 may include: an absolute vector code decomposing unit, adapted for decomposing the absolute vector code to obtain a position code of an element from the absolute vector at an absolute vector at an upper level, and an absolute vector code at the upper level; a position data obtaining unit adapted for decoding the position code to obtain data on position at an upper-level absolute vector for an element from the absolute vector; a data searching unit adapted for searching a preset decoding table for the number of elements in an absolute vector at the upper level, and an element value of the element removed in obtaining the absolute vector; and an absolute vector obtaining unit adapted for arranging elements from the absolute vector at an absolute vector at the upper level in accordance with the position data and providing the element value of the removed element at the remaining position to obtain the absolute vector at the upper level, and triggering the position data obtaining unit to decode the position code corresponding to the absolute vector at the upper level if the absolute vector at the upper level is not the initial absolute vector; the position data obtaining unit may calculate the position code with a preset position data decoding formula, or search a preset position data decoding table for the position data; and a combining unit 84 adapted for combining the sign vector and the initial absolute vector to obtain an initial vector.

As can be seen, the absolute vector is coded using an approach of multi-level permutation-based coding in the embodiment, so that no calculation with complex formulas is conducted, and computation complexity is lowered.

In practice, if a plurality of characteristic codebooks are involved in the coding, the final coded value of the initial vector is obtained in the decoding, thus the vector decoding apparatus according to an embodiment of the present invention may further include:

a characteristic codebook determining unit adapted for determining a characteristic codebook to which the initial vector corresponds, and obtaining a characteristic value of the characteristic codebook in the codebook space; and a coded value determining unit adapted for decomposing a final code of the initial vector in accordance with the characteristic value to obtain a code of the initial vector.

After the code of the initial vector is obtained, the decomposing unit may start to decode the vector.

A stream media player including a vector decoding apparatus according to an embodiment of the present invention is provided, and the vector decoding apparatus includes:

a decomposing unit adapted for decomposing a vector code to obtain a sign code and an absolute vector code;

a sign decoding unit adapted for decoding the sign code to obtain a sign vector;

a multi-level permutation-based decoding unit adapted for performing multi-level permutation-based decoding on the absolute vector code to obtain an initial absolute vector; and a combining unit adapted for combining the sign vector and the initial absolute vector to obtain an initial vector.

As can be seen, the absolute vector is coded using an approach of multi-level permutation-based coding in the embodiment, so that no calculation with complex formulas is conducted, and computation complexity is lowered.

It will be appreciated to those ordinarily skilled in the art that all or part of the above steps of the method according to the embodiments may be accomplished with a program instructing the related hardware, and the program may be stored on a computer-readable storage medium, and carry out the following steps when executed:

decomposing an initial vector to obtain a sign vector and an initial absolute vector; coding the sign vector to obtain a sign code; performing multi-level permutation-based coding on the initial absolute vector to obtain an absolute vector code; and combining the sign code and the absolute vector code to obtain a code of the initial vector.

The above-mentioned storage medium may be an ROM, a magnetic disk, a CD, etc.

The vector coding/decoding method, apparatus and the stream media player according to embodiments of the present invention have been described in detail. The embodiments are described for the purpose of better understanding of the method and its concept in the present invention. Furthermore, it will be appreciated to those ordinarily skilled in the art that modifications and alternations to the embodiments and applications of the present invention can be made. All these descriptions shall not be construed as a limit to the present invention.

What is claimed is:

1. A vector coding method, comprising:

decomposing an initial vector to obtain a sign vector and an initial absolute vector, wherein each respective vector has a plurality of elements;

coding the sign vector to obtain a sign code;

performing multi-level permutation-based coding on the initial absolute vector to obtain an absolute vector code; and combining the sign code and the absolute vector code to obtain a code of the initial vector;

wherein performing multi-level permutation-based coding on the initial absolute vector to obtain an absolute vector code includes:

removing from the plurality of elements of the initial absolute vector any element having an element value which satisfies a preset condition;

constructing a new absolute vector with each of the plurality of elements not satisfying the preset condition;

coding positions of each of the plurality of elements not satisfying the preset condition in the initial absolute vector to obtain a position code;

proceeding with the multi-level permutation-based coding on the new absolute vector if the number of element values in the new absolute vector is larger than 1; and obtaining the absolute vector code by combining all the position codes obtained in the multi-level permutation-based coding if the number of element values in the new absolute vector is 1.

2. The method according to claim 1, further comprising:

determining, before decomposing the initial vector, a characteristic codebook to which the initial vector belongs;

obtaining a characteristic value of the characteristic codebook; and combining, after obtaining the code of the initial vector, the characteristic value and the code of the initial vector to obtain a final code of the initial vector.

3. The method of claim 2, wherein the performing step includes:

removing from the plurality of elements of the initial absolute vector any element having an element value which satisfies a preset condition;

constructing a new absolute vector with each of the plurality of elements not satisfying the preset condition;

coding positions of each of the plurality of elements not satisfying the preset condition in the initial absolute vector to obtain a position code;

proceeding with the multi-level permutation-based coding on the new absolute vector if the number of element values in the new absolute vector is larger than 1; and obtaining the absolute vector code by combining all the position codes obtained in the multi-level permutation-based coding if the number of element values in the new absolute vector is 1.

4. The method of claim 1, further including one of calculating the position code using a preset position code calculating formula and searching in a preset position code table for the position code.

5. The method of claim 3, further including one of calculating the position code using a preset position code calculating formula and searching in a preset position code table for the position code.

6. The method of claim 1, wherein the preset condition is stored in a preset code table, and the removing step further includes searching the preset code table for the element value which satisfies the preset condition.

7. The method of claim 3, wherein the preset condition is stored in a preset code table, and the removing step further includes searching the preset code table for the element value which satisfies the preset condition.

8. The method of claim 1, wherein coding the sign vector to obtain a sign code comprises:

coding signs in the sign vector which correspond to non-zero elements from the inputted vector in order, to obtain the sign code.

9. The method of claim 1, wherein the combining step includes:

determining a number of bits of the sign code; and shifting the absolute vector code left by the number of bits prior to combining with the sign code.

10. The method of claim 1, wherein the coding step further includes eliminating redundancy between a respective sign code for each of the plurality of elements of the sign vector.

11. A computer readable program encoded in a computer readable storage medium, comprising:

an executable computer program code configured to instruct a computer unit to perform a vector coding method comprising the steps of:

controlling a decomposing unit to decompose an initial vector to obtain a sign vector and an initial absolute vector, wherein each respective vector has a plurality of elements;

controlling a sign coding unit to code the sign vector to obtain a sign code;

controlling a multi-level permutation-based coding unit to perform multi-level permutation-based coding on the initial absolute vector to obtain an absolute vector code;

controlling a combining unit to combine the sign code and the absolute vector code to obtain a code of the initial vector;

wherein controlling the multi-level permutation-based coding unit to perform multi-level permutation-based coding on the initial absolute vector to obtain an absolute vector code includes:

removing from the plurality of elements of the initial absolute vector any element having an element value which satisfies a preset condition;

constructing a new absolute vector with each of the plurality of elements not satisfying the preset condition;

coding positions of each of the plurality of elements not satisfying the preset condition in the initial absolute vector to obtain a position code;

proceeding with the multi-level permutation-based coding on the new absolute vector if the number of element values in the new absolute vector is larger than 1; and obtaining the absolute vector code by combining all the position codes obtained in the multi-level permutation-based coding if the number of element values in the new absolute vector is 1.

12. A vector coding apparatus, comprising:

a decomposing unit configured to decompose an initial vector to obtain a sign vector and an initial absolute vector;

a sign coding unit configured to code the sign to obtain a sign code;

a multi-level permutation-based coding unit configured to perform multi-level permutation-based coding on the initial absolute vector to obtain an absolute vector code;

the multi-level permutation-based unit including an element removing unit and an element retaining unit;

a combining unit configured to combine the sign code and the absolute vector code to obtain an initial vector code;

the element retaining unit is configured to retain in order any element not satisfying the preset condition to construct a new absolute vector, a position coding unit configured to code the position of an element not satisfying the preset condition in the initial absolute vector to obtain a position code, and further configured to trigger the element removing unit to remove any element in the new absolute vector of which the element value does not satisfy the preset condition if the number of element values in the new absolute vector is larger than 1; and an absolute vector code unit configured to combine the individual position codes obtained in multi-level permutation-based coding to obtain the absolute vector code if the number of the element values in the new absolute vector is larger than 1.

13. The apparatus of claim 12, further comprising:

a characteristic codebook determining unit configured to determine a characteristic codebook to which the initial vector belongs; and a final coded value obtaining unit configured to obtain a characteristic value of the characteristic codebook and further configured to combine the characteristic value and the code of the initial vector to obtain a final code of the initial vector.

14. The apparatus of claim 13, wherein the element removing unit is configured to remove an element of the initial absolute vector which has a value satisfying a preset condition; and the element retaining unit is configured to retain in order any element not satisfying the preset condition to construct a new absolute vector.

15. The apparatus of claim 13, wherein the multi-level permutation-based coding unit further comprises:

a position coding unit configured to code the position of an element not satisfying the preset condition in the initial absolute vector to obtain a position code, and further configured to trigger the element removing unit to remove any element in the new absolute vector of which the element value does not satisfy the preset condition if the number of element values in the new absolute vector is larger than 1; and an absolute vector code unit configured to combine the individual position codes obtained in multi-level permutation-based coding to obtain the absolute vector code if the number of the element values in the new absolute vector is larger than 1.

16. The apparatus of claim 12, wherein the multi-level permutation-based coding unit further comprises:

a preset code table storage unit configured to store a preset code table in which the preset condition is stored; and the element removing unit is further configured to search the preset code table for any element to be removed.

17. The apparatus of claim 12, wherein the combining unit further comprises:

a bit number determining unit configured to determine a number of bits of a sign code; and the combining unit further configured to shift left the absolute vector code by the number of bits of the sign code.

* * * * *